United States Patent
Pham

(10) Patent No.: US 10,917,384 B2
(45) Date of Patent: Feb. 9, 2021

(54) METHODS, SYSTEMS, AND MEDIA FOR MODIFYING FIREWALLS BASED ON DYNAMIC IP ADDRESSES

(71) Applicants: Synergex Group, Greenwich, CT (US); Wayne Taylor, Chandler, AZ (US); Pham Holdings, Inc., Lacey, WA (US)

(72) Inventor: Thien Van Pham, Lacey, WA (US)

(73) Assignees: Synergex Group, Greenwich, CT (US); Pham Holdings, Inc., Lacey, WA (US); Wayne Taylor, Chandler, AZ (US)

( * ) Notice: Subject to any disclaimer, the term of this patent is extended or adjusted under 35 U.S.C. 154(b) by 131 days.

(21) Appl. No.: 15/702,355

(22) Filed: Sep. 12, 2017

(65) Prior Publication Data
US 2019/0081927 A1    Mar. 14, 2019

(51) Int. Cl.
*H04L 29/06* (2006.01)
*H04L 29/12* (2006.01)

(52) U.S. Cl.
CPC ...... *H04L 63/0263* (2013.01); *H04L 61/2015* (2013.01); *H04L 63/0236* (2013.01); *H04L 63/08* (2013.01); *H04L 63/105* (2013.01); *H04L 63/14* (2013.01); *H04L 63/20* (2013.01)

(58) Field of Classification Search
CPC ............. H04L 63/0263; H04L 63/0236; H04L 61/2015; H04L 63/20; H04L 63/14
See application file for complete search history.

(56) References Cited

U.S. PATENT DOCUMENTS

| | | | |
|---|---|---|---|
| 7,451,234 B1 * | 11/2008 | Bonner | H04L 29/12066 709/220 |
| 8,424,075 B1 * | 4/2013 | Walsh | H04L 63/0263 726/11 |
| 2003/0097590 A1 * | 5/2003 | Syvanne | H04L 63/0227 726/4 |
| 2005/0283536 A1 | 12/2005 | Swanson et al. | |
| 2008/0148380 A1 * | 6/2008 | Abzarian | H04L 63/0263 726/11 |
| 2008/0289027 A1 * | 11/2008 | Yariv | H04L 63/0227 726/11 |
| 2012/0215911 A1 | 8/2012 | Raleigh et al. | |
| 2012/0311693 A1 * | 12/2012 | Horman | H04L 63/0263 726/14 |
| 2017/0126740 A1 | 5/2017 | Ardila et al. | |
| 2017/0353453 A1 * | 12/2017 | Hutchinson | H04L 63/20 |

OTHER PUBLICATIONS

International Search Report and Written Opinion dated Nov. 19, 2018 in International Patent Application No. PCT/US2018/050411.

* cited by examiner

*Primary Examiner* — Ellen Tran
(74) *Attorney, Agent, or Firm* — Byrne Poh LLP

(57) ABSTRACT

Methods, systems, and media for modifying firewall rules based on dynamic Internet Protocol (IP) addresses are provided. In some embodiments, the method comprises: receiving, from a database server, a request to modify a firewall rule of a firewall protecting a remote computer, wherein the request includes an IP address of a user device initiating a connection to the remote computer, and wherein the firewall rule indicates IP addresses of devices allowed to establish connections to the remote computer; determining whether the IP address of the user device is to be added to the firewall rule; and in response to determining that the IP address of the user device is to be added to the firewall rule, adding the current IP address to the firewall rule.

21 Claims, 4 Drawing Sheets

METHODS, SYSTEMS, AND MEDIA FOR MODIFYING FIREWALLS BASED ON DYNAMIC IP ADDRESSES

TECHNICAL FIELD

The disclosed subject matter relates to methods, systems, and media for modifying firewalls based on dynamic IP addresses.

BACKGROUND

Many users want to establish a remote desktop connection to a remote computer. For example, a user away from his or her office may want to establish a remote desktop connection to a work computer using a laptop computer via a public network connection. In some instances, however, a user may be blocked from establishing a remote desktop connection because a firewall blocks unknown addresses from accessing the remote computer. Additionally, in some instances, even if a user's IP address could be programmed into such a firewall, an IP address of a user's computer may be unknown because the IP address is dynamically allocated by the user's Internet Service Provider (ISP).

Accordingly, it is desirable to provide new methods, systems, and media for modifying firewalls based on dynamic IP addresses.

SUMMARY

Methods, systems, and media for modifying firewalls based on dynamic IP addresses are provided. In accordance with some embodiments of the disclosed subject matter, a method for modifying firewalls based on dynamic IP addresses is provided, the method comprising: receiving, from a database server, a request to modify a firewall rule of a firewall protecting a remote computer, wherein the request includes an IP address of a user device initiating a connection to the remote computer, and wherein the firewall rule indicates IP addresses of devices allowed to establish connections to the remote computer; determining whether the IP address of the user device is to be added to the firewall rule; and in response to determining that the IP address of the user device is to be added to the firewall rule, adding the current IP address to the firewall rule.

In accordance with some embodiments of the disclosed subject matter, a system for modifying firewalls based on dynamic IP addresses is provided, the system comprising: a hardware processor that is programmed to: receive, from a database server, a request to modify a firewall rule of a firewall protecting a remote computer, wherein the request includes an IP address of a user device initiating a connection to the remote computer, and wherein the firewall rule indicates IP addresses of devices allowed to establish connections to the remote computer; determine whether the IP address of the user device is to be added to the firewall rule; and in response to determining that the IP address of the user device is to be added to the firewall rule, add the current IP address to the firewall rule.

In accordance with some embodiments of the disclosed subject matter, a non-transitory computer-readable medium containing computer executable instructions that, when executed by a processor, cause the processor to perform a method for modifying firewalls based on dynamic IP addresses is provided. The method comprises: receiving, from a database server, a request to modify a firewall rule of a firewall protecting a remote computer, wherein the request includes an IP address of a user device initiating a connection to the remote computer, and wherein the firewall rule indicates IP addresses of devices allowed to establish connections to the remote computer; determining whether the IP address of the user device is to be added to the firewall rule; and in response to determining that the IP address of the user device is to be added to the firewall rule, adding the current IP address to the firewall rule.

In accordance with some embodiments of the disclosed subject matter, a system for modifying firewalls based on dynamic IP addresses is provided, the system comprising: means for receiving, from a database server, a request to modify a firewall rule of a firewall protecting a remote computer, wherein the request includes an IP address of a user device initiating a connection to the remote computer, and wherein the firewall rule indicates IP addresses of devices allowed to establish connections to the remote computer; means for determining whether the IP address of the user device is to be added to the firewall rule; and in response to determining that the IP address of the user device is to be added to the firewall rule, means for adding the current IP address to the firewall rule.

In some embodiments, the system further comprises: means for determining whether the IP address of the user device is to be removed from the firewall rule; and means for removing the current IP address from the firewall rule in response to determining that the IP address of the user device is to be removed from the firewall rule.

In some embodiments, the system further comprises: means for determining that the firewall rule does not exist; and means for creating the firewall rule in response to determining that the firewall rule does not exist.

In some embodiments, the request includes a firewall rule name that indicates the firewall rule.

In some embodiments, the request is received from the database server in response to a query transmitted to the database server.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In accordance with various embodiments, mechanisms (which can include methods, systems, and media) for modifying firewalls based on dynamic IP addresses are provided.

In some embodiments, the mechanisms described herein can dynamically and remotely add an IP address to a firewall's list of unblocked IP addresses so that, e.g., a user is able to establish a remote desktop connection to a remote computer that is protected by the firewall. In some embodiments, a user device can have a dynamic Internet Protocol (IP) address. In some such embodiments, the user device can transmit a message to a database server that includes a current IP address associated with the user device and a request to add the IP address to firewall rules associated with the remote computer. In some embodiments, the remote computer can transmit a query to the database server to retrieve the current IP address, and can then update firewall rules associated with the remote computer to include the current IP address.

Figure 1:
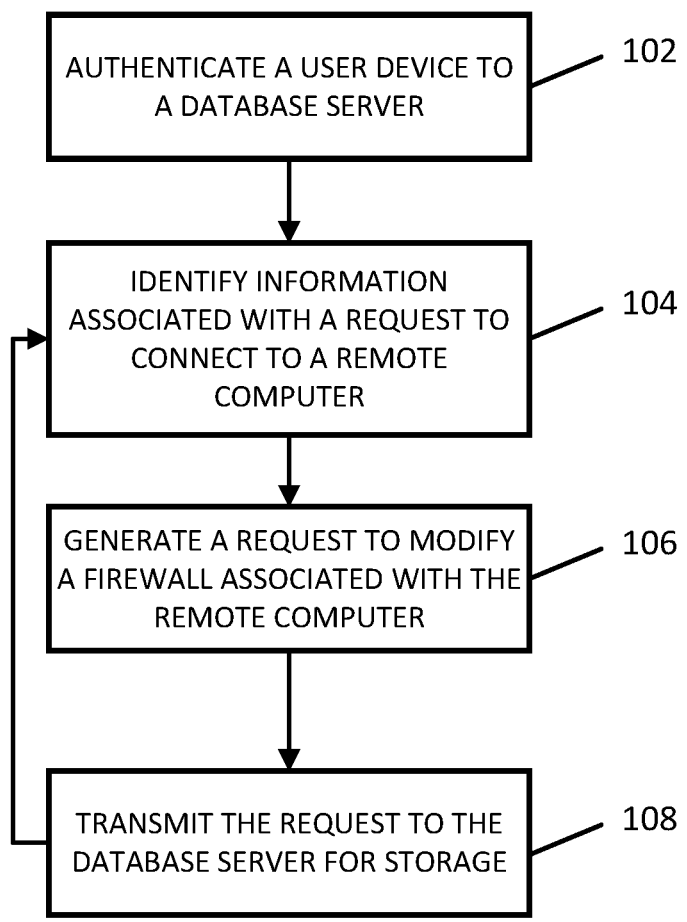
FIG. 1 shows an example of a process for generating a request to add an IP address to a firewall in accordance with some embodiments of the disclosed subject matter.

Turning to FIG. 1, an example 100 of a process for requesting that an IP address associated with a user device be added to a firewall in accordance with some embodiments of the disclosed subject matter is shown. In some embodiments, blocks of process 100 can be executed by any suitable device, such as a user device seeking access to a remote computer (e.g., to establish a remote desktop connection with the remote computer) that is protected by a firewall. More particularly, in some embodiments, blocks of process 100 can be executed by a program (e.g., a web application, a standalone application, and/or any other suitable program) executing on the device.

Process 100 can begin at 102 by authenticating a user device executing process 100 to a database server (e.g., database server 302, as shown in and described below in connection with FIG. 3). For example, in some embodiments, a user of the user device can log in to an account associated with the database server using any suitable technique or combination of techniques. As a more particular example, in some embodiments, the user can enter a username and password associated with the account via a user interface. As another more particular example, in some embodiments, the user can be authenticated to the account using biometric information associated with the user. In some embodiments, the user device can be authenticated to the database server using any other suitable authentication technique(s).

Process 100 can, at 104, identify information related to a request to add an IP address to a firewall protecting the remote computer. For example, in some embodiments, process 100 can determine an identifier of a remote computer the user device is to be connected to. In some embodiments, process 100 can determine the identifier of the remote computer using any suitable technique. For example, in some embodiments, process 100 can determine an identifier of the remote computer by receiving a selection of a name identifying the remote computer via a user interface. As another example, in some embodiments, process 100 can identify one or more remote computers that a user of the user device may have permission to establish a remote connection with. As a more particular example, in some embodiments, process 100 can identify a specific remote computer associated with a name of the user. As another more particular example, in some embodiments, process 100 can identify multiple remote computers based on a user type associated with the user (e.g., that the user has administrator privileges on each of the remote computers, and/or any other suitable user type). In some such embodiments, process 100 can cause indications of the remote computer(s) that were identified to be presented to the user (e.g., via a user interface) for selection by the user.

As another example, in some embodiments, process 100 can determine information associated with the user device. As a more particular example, in some embodiments, process 100 can determine a current IP address associated with the user device. As another more particular example, in some embodiments, process 100 can determine a geographic location of the user device (e.g., a latitude and/or a longitude associated with a current location of the user device, information indicating that the user device is not currently located in the user's office, and/or any other suitable geographic location).

As yet another example, in some embodiments, process 100 can determine an action associated with the request, such as that the current IP address is to be added to a list of firewall rules associated with the remote computer or that the current IP address is to be removed from the list of firewall rules associated with the remote computer. As a more particular example, in instances where process 100 determines that the user device is to establish a new connection to the remote computer, process 100 can determine that the current IP address is to be added to the list of firewall rules. As another more particular example, in instances where process 100 determines that a connection to the remote computer is to be terminated (e.g., based on explicit input from a user of the user device, based on a duration of time elapsing without activity on the user device, and/or based on any other suitable information), process 100 can determine that the current IP address is to be removed from the list of firewall rules.

In some embodiments, process 100 can determine any suitable criteria corresponding to a request to modify the firewall rules. For example, in instances where the request is to add the IP address to the list of firewall rules, process 100 can determine any suitable timing information to be included in the request. As a more particular example, in some embodiments, process 100 can determine a duration of time the request is valid (e.g., an hour, two hours, a day, a month, and/or any other suitable duration of time), a date and/or a time the IP address is to be removed from the firewall rules, a time window (e.g., between 1 pm and 3 pm on a particular date, on particular days of the week, during particular hours of the day, and/or any other suitable time windows) during which the IP address is to be included in the firewall rules, and/or any other suitable timing information. As another more particular example, in some embodiments, process 100 can determine types of connections between the user device and the remote computer for which the request is valid. As a specific example, in some embodiments, process 100 can determine that the request is valid if the user device is implementing particular remote desktop connection techniques, using a particular level of encryption and/or encryption protocol, using particular authentication techniques (e.g., multi-factor authentication, and/or any other suitable techniques), and/or any other suitable criteria.

At 106, process 100 can generate a request to modify a firewall protecting a remote computer based on the identified information. For example, in some embodiments, the request can include an identifier of the remote computer. As another example, in some embodiments, the request can include a current IP address associated with the user device. As yet another example, in some embodiments, the request can include an action value parameter that indicates whether the current IP address is to be added to a list of firewall rules that indicates IP addresses of devices allowed to establish connections to the remote computer, removed from a list of firewall rules, and/or any other suitable action. As still another example, in some embodiments, the request can include any suitable timing information associated with dates and/or times the IP address associated with the user device is to be included in firewall rules indicating IP addresses of devices allowed to establish connections to the remote computer. As a more particular example, as described above, the timing information included in the request can indicate that the IP address is to be included in the firewall rules for a particular duration of time (e.g., an hour, two hours, a day, a month, and/or any other suitable duration of time), until a particular date and/or time, during a particular time range (e.g., between 1 pm and 5 pm, between 1 pm on a particular date until 1 pm on a different date, and/or any other suitable time range), during particular days of the week (e.g., on Mondays, on week days, on weekend days, and/or any other suitable days), during particular hours of the day (e.g., after 9 pm, between 9 am and 5 pm, and/or any other suitable hours), and/or any other suitable timing information or combination of timing information. As still another particular example, as described above, the request can include criteria that are to be satisfied if the IP address is to be included in firewall rules indicating IP addresses of devices allowed to establish connections to the remote computer. As a more particular example, as described above, the criteria can include particular types of connection protocols (e.g., that a particular remote desktop connection technique must be used, and/or any other suitable protocol) are to be used, that particular types or levels of encryption are to be used, that particular types of authentication (e.g., multi-factor authentication, and/or any other suitable types of authentication) are to be used, and/or any other suitable criteria.

In some embodiments, the request can include a firewall rule name. For example, in some embodiments, the firewall name can indicate that the request is related to inbound rules associated with the firewall, outbound rules associated with the firewall, and/or any other suitable rules. As another example, in some embodiments, the firewall name can indicate that the request is related to performing a particular activity on the remote computer, such as establishing a remote desktop connection, file transfer, remote printing, and/or any other suitable activity. As a more particular example, in some embodiments, the firewall name can indicate that the request is related to a specific port associated with the connection between the user device and the remote computer.

At 108, process 100 can transmit the request to the database server (e.g., database server 302 as shown in and described below in connection with FIG. 3) for storage by the database server. In some embodiments, process 100 can transmit the request to the database server using any suitable technique. For example, in some embodiments, process 100 can transmit the request via a network router connected to the device that connects the device to the database server via a communication network, as shown in and described below in more detail in connection with FIG. 3.

In some embodiments, process 100 can loop back to block 104 at any suitable time. For example, in some embodiments, process 100 can loop back to block 104 and identify information for generating a request to a remote computer to update the firewall rules associated with the remote computer in response to determining that a certain amount of time has elapsed, that an IP address associated with the device has changed, and/or at any other suitable time point. In some embodiments, in instances when process 100 loops back to block 104 while the user device is connected to the remote computer, process 100 can determine any suitable subset of information. For example, in some embodiments, process 100 can loop back to block 104 and can determine updated timing information, updated connection criteria, and/or any other suitable updated information.

Figure 2:
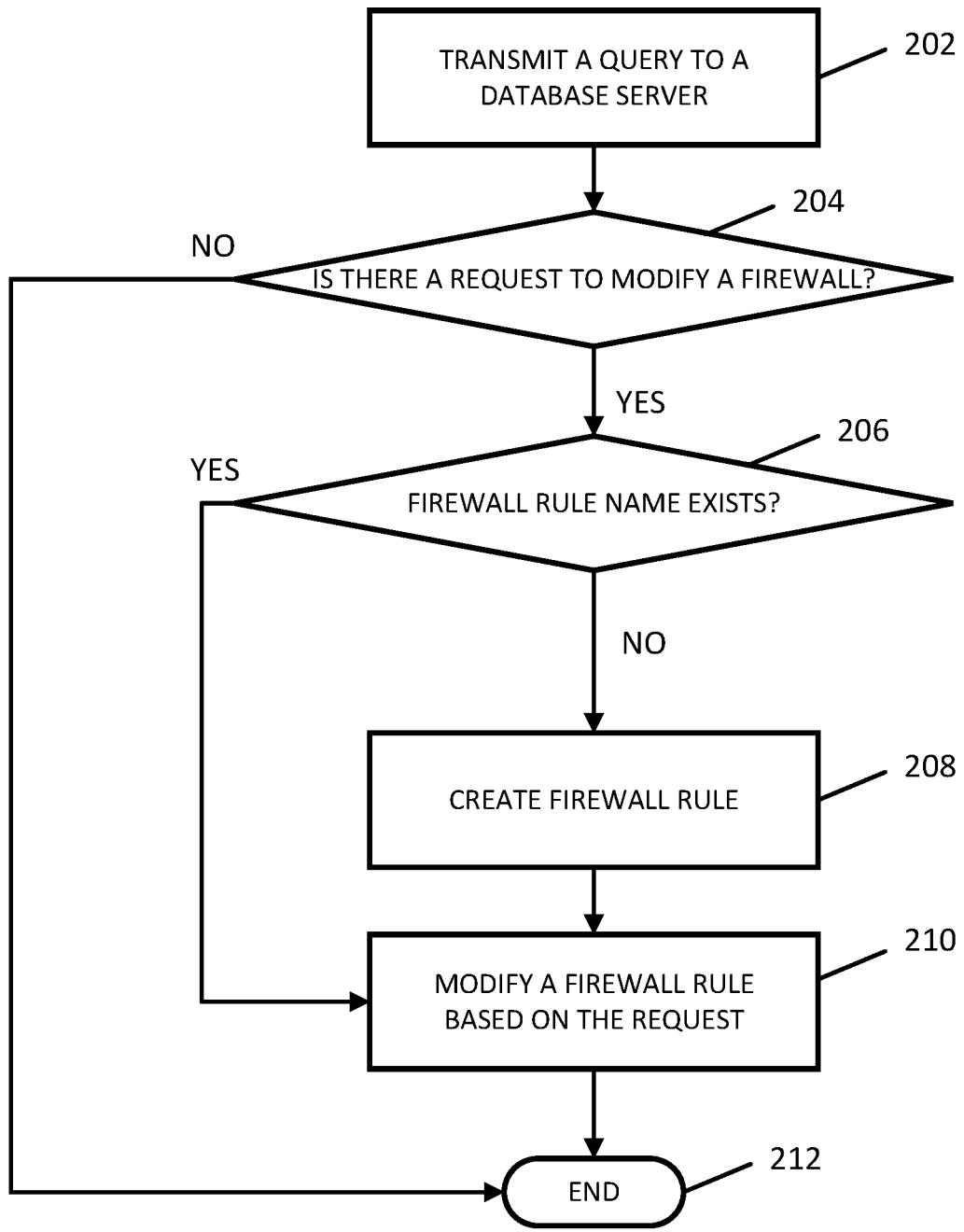
FIG. 2 shows an example of a process for modifying a firewall based on a retrieved request in accordance with some embodiments of the disclosed subject matter.

Turning to FIG. 2, an example 200 of a process for modifying firewall rules for a firewall protecting a remote computer in accordance with some embodiments of the disclosed subject matter is shown. In some embodiments, blocks of process 200 can be executed on a firewall device (e.g., firewall 314 as shown in and described below in connection with FIG. 3) that protects a remote computer and/or on a remote computer device that uses a firewall.

Process 200 can begin at 202 by querying a database server (e.g., database server 302, as shown in and described below in connection with FIG. 3) to determine if a request to modify a firewall associated with the remote computer is available. For example, in some embodiments, the database server can be a database server that receives and stores requests for modifications to a firewall. As a more particular example, in some embodiments, a database server can receive, from a user device, a request to modify a firewall rule to include an IP address of the user device, as described above in connection with FIG. 1. In some embodiments, process 200 can include any suitable information in the transmitted query to the database server. For example, in some embodiments, process 200 can include an identifier of the remote computer, which can be used by the database server to identify requests directed to the remote computer.

At 204, process 200 can determine whether there is an available request to modify a firewall protecting the remote computer that is directed to the remote computer. Process 200 can determine whether there is an available request based on any suitable information. For example, in some embodiments, process 200 can determine whether there is an available request based on a response to the query received from the database server. As a more particular example, in some embodiments, in instances where there is no available request, process 200 can receive, from the database server, a response that indicates that no request corresponding to the remote computer was found. As another more particular example, in some embodiments, in instances where there is an available request, process 200 can receive, from the database server, a response that includes information corresponding to the request.

In instances where process 200 receives, from the database server, a response that indicates that a request to modify firewall rules received from a particular user device is available, the response can include any suitable information corresponding to the request. For example, in some embodiments, the information can include a current IP address associated with the user device. As another example, in some embodiments, the information can include an action value that indicates a manner in which a particular firewall rule is to be modified. As a more particular example, in some embodiments, the action value can indicate that the IP address associated with the user device is to be added to a particular firewall rule that indicates IP addresses of devices allowed to establish connections to the remote computer. In some such embodiments, the action value and/or the information included in the request can additionally include timing information that indicates a time period during which the IP address is to be included in the firewall rules, as described above in more detail in connection with blocks 104 and 106 of FIG. 1. As another more particular example, in some embodiments, the action value can indicate that the IP address associated with the user device is to be removed from a particular firewall rule that indicates IP addresses of devices allowed to establish connections to the remote computer. As yet another example, in some embodiments, the information can include one or more firewall rule names. As a more particular example, in some embodiments, the firewall rule name can indicate that the request corresponds to inbound rules and/or outbound rules. As another more particular example, in some embodiments, the firewall rule name can indicate that the request corresponds to a particular activity, such as establishing a remote desktop connection, printing, file transfer, and/or any other suitable activity.

Note that, in some embodiments, process 200 can directly receive the information corresponding to the request from the database server without transmitting a query to the database server. For example, in some embodiments, the database server can push a request received from a user device to a remote computer to which it is directed or to a firewall protecting the remote computer upon receipt of the request from the user device. As a more particular example, in some embodiments, the database server can maintain a connection (e.g., a Virtual Private Network, and/or any other suitable type of connection) to the remote computer and/or to the firewall protecting the remote computer and can use the connection to transmit information corresponding to the request. In some such embodiments, blocks 202 and 204 can be omitted.

If, at 204, process 200 determines that there is no available request ("no" at 204), process 200 can end at 212.

If, at 204, process 200 determines that there is an available request ("yes" at 204), process 200 can determine if a firewall rule name corresponding to the request already exists at 206. Note that, the firewall rule name can be a name associated with any suitable set of firewall rules, such as inbound rules, outbound rules, rules corresponding to particular activities, and/or any other suitable rules. Process 200 can determine whether the firewall rule name exists in any suitable manner. For example, in some embodiments, process 200 can determine whether the firewall rule name is included in a list of firewall rule names stored in a memory of a firewall device and/or in a memory of the remote computer (e.g., memory 404 of firewall 314 and/or memory 404 of remote computer 304, as shown in and described below in connection with FIGS. 3 and 4). Note that, in instances where the request includes multiple firewall rule names (e.g., a first firewall rule corresponding to an inbound rule, a second firewall rule name corresponding to an outbound rule, and/or any other suitable firewall rule names), process 200 can determine whether each of the multiple firewall rule names already exist.

If, at 206, process 200 determines that the firewall rule name already exists ("yes" at 206), process 200 can proceed to block 210. In instances where multiple firewall rule names were included in the request, process 200 can proceed to block 210 in response to determining that all of the firewall rule names already exist.

If, at 206, process 200 determines that the firewall rule name does not already exist ("no" at 206), process 200 can create a firewall rule corresponding to the firewall rule name at 208. For example, in some embodiments, process 200 can create a new list that corresponds to the firewall rule name.

At 210, process 200 can modify a firewall rule corresponding to the firewall rule name based on the request. In some embodiments, process 200 can modify the firewall rule based on any suitable information included in the request, such as an action parameter value that indicates a manner in which the firewall rule is to be modified, timing information, criteria information, and/or any other suitable information. For example, in instances where process 200 determines that an IP address of the user device is to be removed from the firewall rule, process 200 can delete the IP address from a list of IP addresses indicating user devices allowed to establish connections to the remote computer. In some embodiments, process 200 can determine if the IP address of the user device is to be removed from the firewall rule using any suitable technique or combination of techniques. For example, in some embodiments, the request can include an explicit instruction to remove the IP address from the firewall rule (e.g., based on an action parameter value). As another example, in some embodiments, process 200 can determine that the IP address of the user device is to be removed from the firewall rule based on timing information or criteria information included in the request. As a more particular example, in instances where the request indicates timing information corresponding to times when the IP address is to be included in the firewall rule, process 200 can determine whether a current time is outside of the times when the IP address is to be included in the firewall rule. As a specific example, in an instance where the timing information indicates that the IP address is to be included in the firewall rule until a particular time on a particular date, process 200 can determine if a current time is after the particular time and the particular date. As another more particular example, in instances where the criteria information indicate that particular types of connection protocols, authentication protocols, and/or encryption protocols must be used, process 200 can determine that the IP address of the user device is to be removed in response to determining that the criteria are not satisfied at a current time.

As another example, in instances where process 200 determines that the firewall rule is to be modified to include the IP address of the user device, process 200 can add the IP address to a firewall rule corresponding to the firewall rule name. In some embodiments, prior to adding the IP address of the user device to the firewall rule, process 200 can determine whether any suitable criteria are satisfied. For example, in some embodiments, process 200 can determine whether a current time is within a time range indicated in timing information included in the request specifying times the IP address is to be included in the firewall rule, and can modify the firewall rule to include the IP address in response to determining that the current time is included in the time range. As another example, in some embodiments, process 200 can determine whether criteria associated with a connection with the user device are satisfied. As a more particular example, in some embodiments, process 200 can determine whether the user device is using a particular type or level of encryption, a particular type or level of authentication, a particular type of remote desktop protocol, and/or any other suitable criteria, and can add the IP address of the user device to the firewall rule in response to determining that the criteria are satisfied. As another more particular example, in some embodiments, process 200 can determine whether a location of the user device satisfies particular geographic information (e.g., whether the user device is currently located within a particular geographic area, whether the user device is not currently located within a particular geographic area, and/or any other suitable geographic information). As a specific example, in some embodiments, process 200 can determine that the IP address of the user device is to be added to the firewall rule in response to determining that geographic information indication a location of the user device indicates that the user device is currently located in a particular location or group of locations (e.g., in a particular group of countries, and/or in any other suitable group of locations).

Note that, in some embodiments, determining whether any suitable criteria are satisfied prior to modifying a firewall rule can be performed by the database server. For example, in some embodiments, the database server can determine whether criteria related to timing information, connection information, geographic information, and/or any other suitable information are satisfied, and, if the criteria are not satisfied, the database server can delete the request without transmitting the request to the firewall device and/or to the remote computer.

Process 200 can end at 212. Additionally or alternatively, in some embodiments, process 200 can loop back to block 202 and can query the database server to determine if additional or updated requests to modify the firewall rules have been received.

Figure 3:
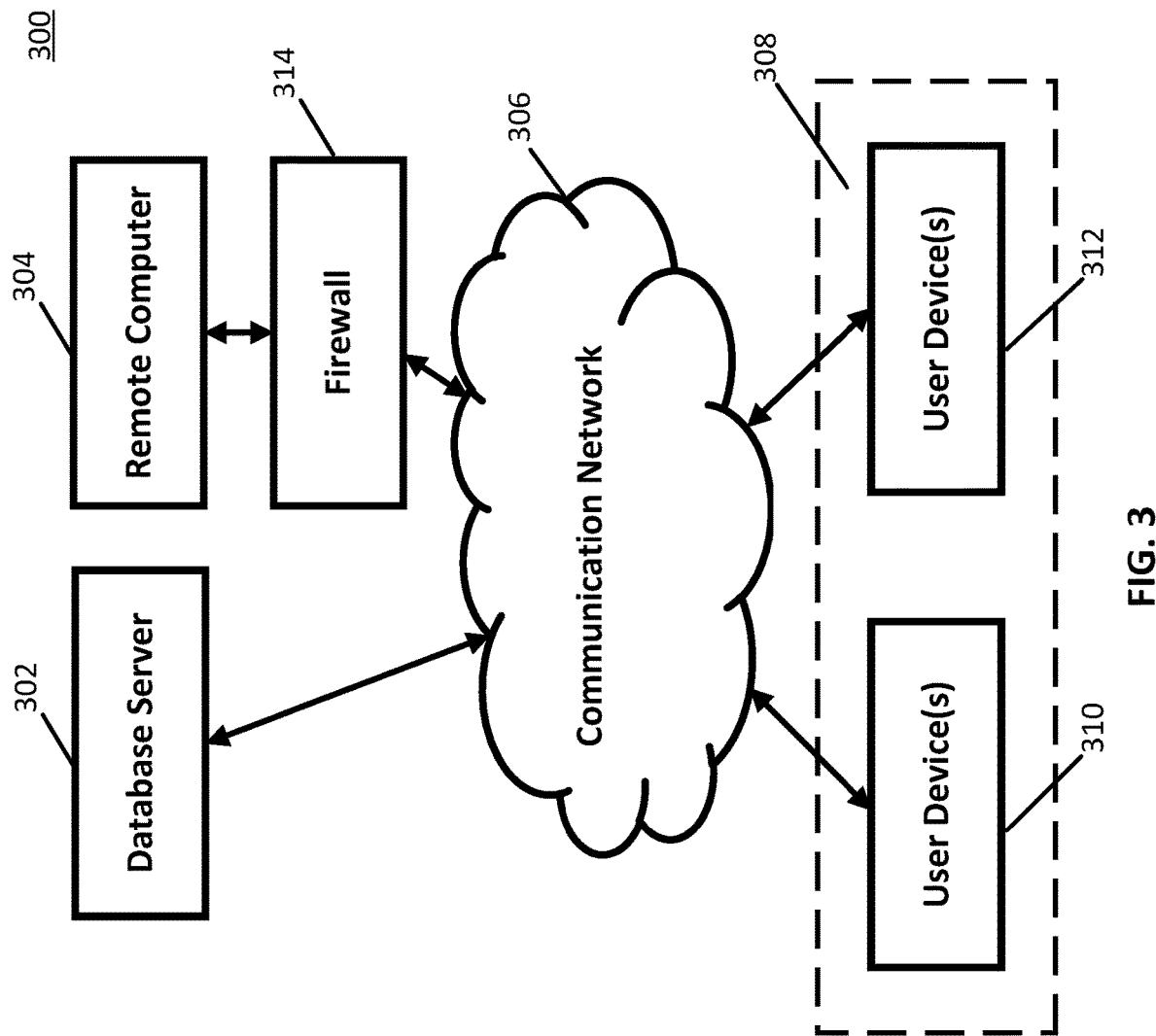
FIG. 3 shows a schematic diagram of an illustrative system suitable for modifying firewalls based on dynamic IP addresses in accordance with some embodiments of the disclosed subject matter.
Figure 4:
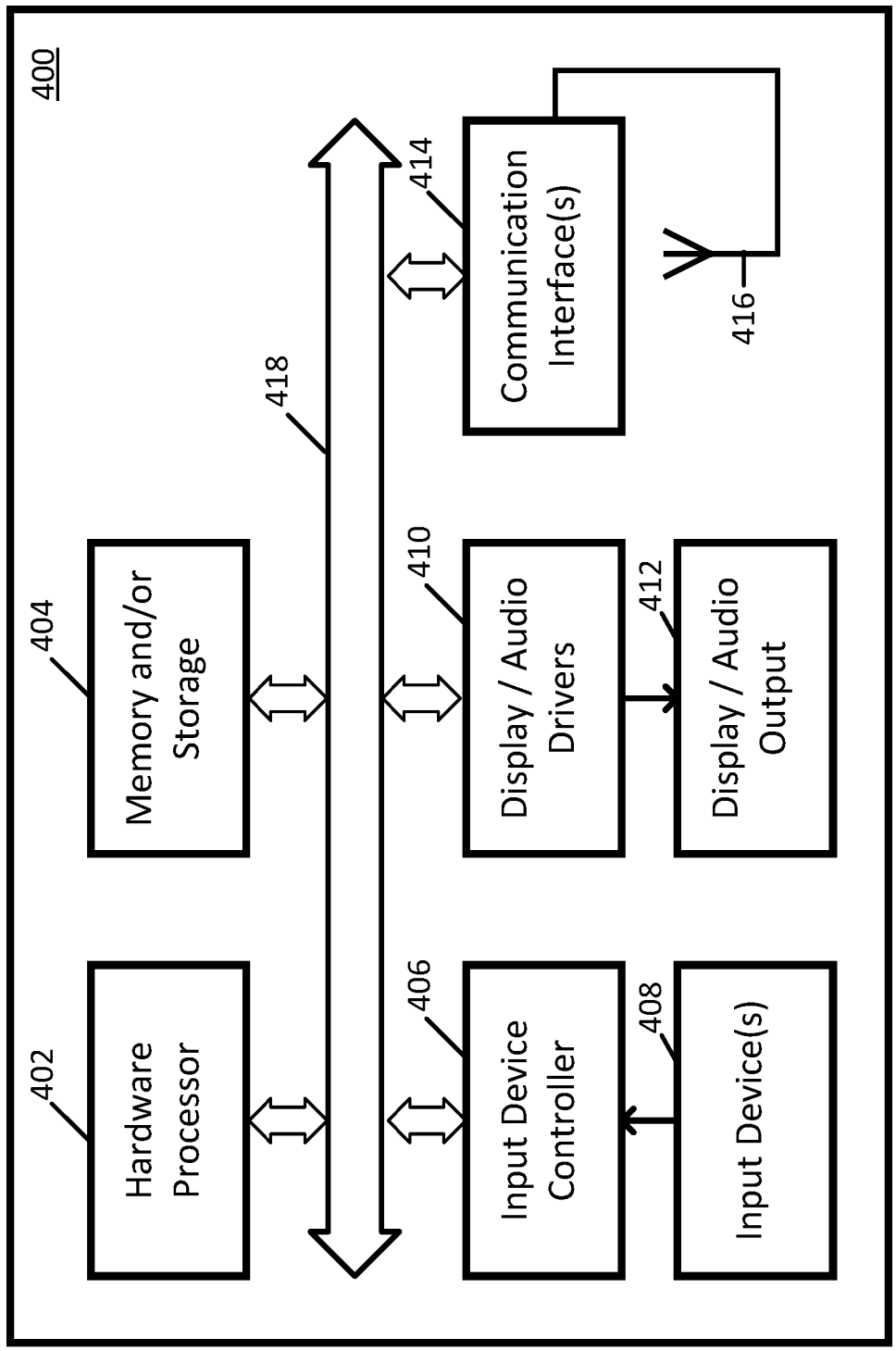
FIG. 4 shows a detailed example of hardware that can be used in a server and/or a user device of FIG. 3 in accordance with some embodiments of the disclosed subject matter.

Turning to FIG. 3, an example 300 of hardware for modifying firewall rules that can be used in accordance with some embodiments of the disclosed subject matter is shown. As illustrated, hardware 300 can include a database server 302, a remote computer 304, a communication network 306, one or more user devices 308, such as user devices 310 and 312, and/or firewall 314.

Database server 302 can be any suitable server(s) for storing information for modifying a firewall protecting remote computer 304. For example, in some embodiments, database server 302 can receive a request from a user device 308 attempting to establish a remote connection to remote computer 304, as described above in connection with FIG. 1. As another example, in some embodiments, database server 302 can transmit stored requests and/or information corresponding to stored requests to remote computer 304, as described above in connection with FIG. 2.

Remote computer 304 can be any suitable device that receives requests for access from user device 308. For example, in some embodiments, user device 308 can establish a remote desktop connection with remote computer 304. In some embodiments, remote computer 304 can be protected by firewall 314, as described above in connection with FIG. 2.

Communication network 306 can be any suitable combination of one or more wired and/or wireless networks in some embodiments. For example, communication network 306 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 308 can be connected by one or more communications links to communication network 306 that can be linked via one or more communications links to database server 302 and remote computer 304. The communications links can be any communications links suitable for communicating data among user devices 308, database server 302, and remote computer 304, such as network links, dial-up links, wireless links, hard-wired links, any other suitable communications links, or any suitable combination of such links. In some embodiments, communication via communication network 306 can be through transmitted network packets corresponding to any suitable type of communication protocol, such as Transmission Control Protocol (TCP), User Datagram Protocol (UDP), and/or any other suitable protocol.

User devices 308 can include any one or more user devices (such as user device 310 and/or 312) suitable for communicating with database server 302 and/or remote computer 304. For example, in some embodiments, user devices 308 can include a mobile device, such as a mobile phone, a tablet computer, a wearable computer, a laptop computer, a vehicle (e.g., a car, a boat, an airplane, or any other suitable vehicle) information and/or entertainment system, and/or any other suitable mobile device. As another example, in some embodiments, user devices 308 can include a non-mobile device, such as a television, a projector device, a game console, desktop computer, and/or any other suitable non-mobile device. In some embodiments, user device 308 can establish a remote desktop connection with remote computer 304.

In some embodiments, firewall 314 can be any suitable device for protecting remote computer 304. For example, in some embodiments, firewall 314 can be a device that stores and maintains lists of IP addresses associated with user devices that are allowed to establish connections with remote computer 304 and/or that are blocked from establishing connections with remote computer 304. Note that, although firewall 314 is shown as a device separate from remote computer 304, in some embodiments, firewall 314 can be combined with remote computer 304.

Although database server 302 and remote computer 304 are illustrated as two devices, the functions performed by database server 302 and/or remote computer 304 can be performed using any suitable number of devices (including only one) in some embodiments. For example, in some embodiments, one, three, or more devices can be used to implement the functions performed by database server 302 and/or remote computer 304.

Although two user devices 310 and 312 are shown in FIG. 3 to avoid over-complicating the figure, any suitable number of user devices (including only one), and/or any suitable types of user devices, can be used in some embodiments.

Database server 302, remote computer 304, and user devices 308 can be implemented using any suitable hardware in some embodiments. For example, in some embodiments, devices 302, 304, and/or 308 can be implemented using any suitable general purpose computer or special purpose computer. For example, a mobile phone may be implemented using a special purpose computer. Any such general purpose computer or special purpose computer can include any suitable hardware. For example, as illustrated in example hardware 400 of FIG. 4, such hardware can include hardware processor 402, memory and/or storage 404, an input device controller 406, an input device 408, display/audio drivers 410, display and audio output circuitry 412, communication interface(s) 414, an antenna 416, and a bus 418.

Hardware processor 402 can include any suitable hardware processor, such as a microprocessor, a micro-controller, digital signal processor(s), dedicated logic, and/or any other suitable circuitry for controlling the functioning of a general purpose computer or a special purpose computer in some embodiments. In some embodiments, hardware processor 402 can be controlled by a computer program stored in memory and/or storage 404 of a user device 308. For example, in some embodiments, the computer program can cause hardware processor 402 to perform a process (or part thereof) as described above in connection with FIG. 1. In some embodiments, hardware processor 402 can be controlled by a computer program stored in memory and/or storage 404 of firewall 314 and/or remote computer 304. For example, in some embodiments, the computer program can cause hardware processor 402 to perform a process (or part thereof) as described above in connection with FIG. 2.

Memory and/or storage 404 can be any suitable memory and/or storage for storing programs, data, media content, and/or any other suitable information in some embodiments. For example, memory and/or storage 404 can include random access memory, read-only memory, flash memory, hard disk storage, optical media, and/or any other suitable memory.

Input device controller 406 can be any suitable circuitry for controlling and receiving input from one or more input devices 408 in some embodiments. For example, input device controller 406 can be circuitry for receiving input from a touchscreen, from a keyboard, from a mouse, from one or more buttons, from a voice recognition circuit, from a microphone, from a camera, from an optical sensor, from an accelerometer, from a temperature sensor, from a near field sensor, and/or any other type of input device.

Display/audio drivers 410 can be any suitable circuitry for controlling and driving output to one or more display/audio output devices 412 in some embodiments. For example, display/audio drivers 410 can be circuitry for driving a touchscreen, a flat-panel display, a cathode ray tube display, a projector, a speaker or speakers, and/or any other suitable display and/or presentation devices.

Communication interface(s) 414 can be any suitable circuitry for interfacing with one or more communication networks, such as network 306 as shown in FIG. 3. For example, interface(s) 414 can include network interface card circuitry, wireless communication circuitry, and/or any other suitable type of communication network circuitry.

Antenna 416 can be any suitable one or more antennas for wirelessly communicating with a communication network (e.g., communication network 306) in some embodiments. In some embodiments, antenna 416 can be omitted.

Bus 418 can be any suitable mechanism for communicating between two or more components 402, 404, 406, 410, and 414 in some embodiments.

Any other suitable components can be included in hardware 400 in accordance with some embodiments.

In some embodiments, at least some of the above described blocks of the processes of FIGS. 1 and 2 can be executed or performed in any order or sequence not limited to the order and sequence shown in and described in connection with the figures. Also, some of the above blocks of FIGS. 1 and 2 can be executed or performed substantially simultaneously where appropriate or in parallel to reduce latency and processing times. Additionally or alternatively, some of the above described blocks of the processes of FIGS. 1 and 2 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, methods, systems, and media for modifying firewall rules based on dynamic IP addresses are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for modifying firewall rules based on dynamic Internet Protocol (IP) addresses, comprising:
   identifying, using a hardware processor, at least one computer that a user of a user device has permission to establish a remote connection with;
   causing indications of the at least one computer to be presented to the user for selection by the user;
   receiving a selection of a name of a computer of the at least one computer from the user;
   receiving, from a server, a request to modify a firewall rule of a firewall protecting the computer, wherein the request includes a current IP address of the user device, and wherein the firewall rule indicates IP addresses of devices allowed to establish connections to the computer;
   determining whether the user device is using a particular type of encryption;
   determining whether the current IP address of the user device is to be added to the firewall rule based on whether the user device is using the particular type of encryption; and
   in response to determining that the current IP address of the user device is to be added to the firewall rule, adding the current IP address to the firewall rule.

2. The method of claim 1, further comprising:
   determining whether the current IP address of the user device is to be removed from the firewall rule; and
   in response to determining that the current IP address of the user device is to be removed from the firewall rule, removing the current IP address from the firewall rule.

3. The method of claim 1, further comprising:
   determining that the firewall rule does not exist; and
   in response to determining that the firewall rule does not exist, creating the firewall rule.

4. The method of claim 1, wherein the request includes a firewall rule name that indicates the firewall rule.

5. The method of claim 1, wherein the request is received from the server in response to a query transmitted to the server.

6. The method of claim 1, wherein determining whether the current IP address of the user device is to be added to the firewall rule is also based on whether the user device is using a particular type of authentication.

7. The method of claim 6, wherein determining whether the current IP address of the user device is to be added to the firewall rule is also based on whether the user device is using a particular type of remote desktop protocol.

8. A system for modifying firewall rules based on dynamic Internet Protocol (IP) addresses, the system comprising:
   a first hardware processor that is programmed to:
     identify, using a hardware processor, at least one computer that a user of a user device has permission to establish a remote connection with;
     cause indications of the at least one computer to be presented to the user for selection by the user; and
     receive a selection of a name of a computer of the at least one computer from the user; and a second hardware processor that is programmed to:
receive, from a server, a request to modify a firewall rule of a firewall protecting the computer, wherein the request includes a current IP address of the user device, and wherein the firewall rule indicates IP addresses of devices allowed to establish connections to the computer;
determine whether the user device is using a particular type of encryption;
determine whether the current IP address of the user device is to be added to the firewall rule based on whether the user device is using the particular type of encryption; and
in response to determining that the current IP address of the user device is to be added to the firewall rule, add the current IP address to the firewall rule.

9. The system of claim 8, wherein the second hardware processor is further programmed to:
determine whether the current IP address of the user device is to be removed from the firewall rule; and
in response to determining that the current IP address of the user device is to be removed from the firewall rule, remove the current IP address from the firewall rule.

10. The system of claim 8, wherein the second hardware processor is further programmed to:
determine that the firewall rule does not exist; and
in response to determining that the firewall rule does not exist, create the firewall rule.

11. The system of claim 8, wherein the request includes a firewall rule name that indicates the firewall rule.

12. The system of claim 8, wherein the request is received from the server in response to a query transmitted to the server.

13. The system of claim 8, wherein determining whether the current IP address of the user device is to be added to the firewall rule is also based on whether the user device is using a particular type of authentication.

14. The system of claim 13, wherein determining whether the current IP address of the user device is to be added to the firewall rule is also based on whether the user device is using a particular type of remote desktop protocol.

15. A non-transitory computer-readable medium containing computer executable instructions that, when executed by a plurality of processors, cause the plurality of processors to perform a method for modifying firewall rules based on dynamic Internet Protocol (IP) addresses, the method comprising:
identifying, using a hardware processor, at least one computer that a user of a user device has permission to establish a remote connection with;
causing indications of the at least one computer to be presented to the user for selection by the user;
receiving a selection of a name of a computer of the at least one computer from the user;
receiving, from a server, a request to modify a firewall rule of a firewall protecting the computer, wherein the request includes a current IP address of the user device, and wherein the firewall rule indicates IP addresses of devices allowed to establish connections to the computer;
determining whether the user device is using a particular type of encryption;
determining whether the current IP address of the user device is to be added to the firewall rule based on whether the user device is using the particular type of encryption; and
in response to determining that the current IP address of the user device is to be added to the firewall rule, adding the current IP address to the firewall rule.

16. The non-transitory computer-readable medium of claim 15, wherein the method further comprises:
determining whether the current IP address of the user device is to be removed from the firewall rule; and
in response to determining that the current IP address of the user device is to be removed from the firewall rule, removing the current IP address from the firewall rule.

17. The non-transitory computer-readable medium of claim 15, wherein the method further comprises:
determining that the firewall rule does not exist; and
in response to determining that the firewall rule does not exist, creating the firewall rule.

18. The non-transitory computer-readable medium of claim 15, wherein the request includes a firewall rule name that indicates the firewall rule.

19. The non-transitory computer-readable medium of claim 15, wherein the request is received from the server in response to a query transmitted to the server.

20. The non-transitory computer-readable medium of claim 15, wherein determining whether the current IP address of the user device is to be added to the firewall rule is also based on whether the user device is using a particular type of authentication.

21. The non-transitory computer-readable medium of claim 20, wherein determining whether the current IP address of the user device is to be added to the firewall rule is also based on whether the user device is using a particular type of remote desktop protocol.

* * * * *